United States Patent
Liu et al.

(10) Patent No.: US 7,127,169 B1
(45) Date of Patent: Oct. 24, 2006

(54) FIBER OPTIC TUNABLE ADD-DROP MULTIPLEXER/DEMULTIPLEXER

(75) Inventors: Yuqiao Liu, Sunnyvale, CA (US); Wei-Shin Tsay, Saratoga, CA (US)

(73) Assignee: Alliance Fiber Optic Products, Inc., Sunnyvale, CA (US)

( * ) Notice: Subject to any disclaimer, the term of this patent is extended or adjusted under 35 U.S.C. 154(b) by 955 days.

(21) Appl. No.: 10/212,317

(22) Filed: Aug. 5, 2002

(51) Int. Cl.
*H04J 14/02* (2006.01)

(52) U.S. Cl. .............................. 398/82; 398/83; 398/85

(58) Field of Classification Search ................ 398/82, 398/83, 85; 385/37, 24, 27, 15
See application file for complete search history.

(56) References Cited

U.S. PATENT DOCUMENTS

| | | | |
|---|---|---|---|
| 5,982,518 A | 11/1999 | Mizrahi | |
| 5,982,791 A * | 11/1999 | Sorin et al. | 372/25 |
| 6,122,096 A | 9/2000 | Fatehi | |
| 6,594,410 B1 * | 7/2003 | Kersey et al. | 385/15 |
| 6,728,445 B1 * | 4/2004 | Blomquist et al. | 385/37 |
| 6,738,543 B1 * | 5/2004 | Beeson et al. | 385/27 |
| 6,751,375 B1 * | 6/2004 | Meyer | 385/27 |
| 6,795,610 B1 * | 9/2004 | Meyer | 385/27 |

* cited by examiner

*Primary Examiner*—David C. Payne
(74) *Attorney, Agent, or Firm*—Joe Zheng (57) ABSTRACT

Techniques for calibrating tunable optical devices using a probing signal as a reference so as to achieve an accurate control over an absolute wavelength of the tunable optical devices. A probing signal being a calibrated optical signal with a spectrum centered at a desired add/drop channel or wavelength is introduced into an N-port circulator coupled between two tunable optical devices. When the two tunable optical devices are tuned not exactly at the desired wavelength, a portion of probing signal will be reflected or dropped out by the two tunable optical devices. The dropped probing signal is detected and coupled to a signal processor or circuitry configured to generate adjustments to or the control signals for controlling the tunable optical devices in accordance with the reflected probing signal being maximized.

20 Claims, 8 Drawing Sheets

FIBER OPTIC TUNABLE ADD-DROP MULTIPLEXER/DEMULTIPLEXER

BACKGROUND OF THE INVENTION

1. Field of the Invention

The invention is generally related to the area of optical data communications, and more particularly, related to add/drop optical devices or subsystems.

2. The Background of Related Art

The future communication networks demand ever increasing bandwidths and flexibility to different communication protocols. Fiber optic networks are becoming increasingly popular for data transmission due to their high speed, high capacity capabilities. Wavelength division multiplexing (WDM) is a technology that puts data from different sources together on an optical fiber with each signal carried at the same time on its own separate light wavelength. Using the WDM system, up to 80 (and theoretically more) separate wavelengths or channels of data can be multiplexed into a light stream transmitted on a single optical fiber. To take the benefits and advantages offered by the WDM system, there require many sophisticated optical network elements.

A tunable WDM add/drop system is one of such elements that are designed to add or drop one or more specific wavelengths or channel signals. In a fiber optic network, there are cases of exchanging wavelengths among optical signals on "loops" within networks. The exchanges occur at points where two or more loops intersect for the purpose of exchanging wavelengths. In particular, the exchanging of data signals involves the exchanging of matching wavelengths from two different loops within an optical network. In other words, a signal would drop a wavelength to the other loop while simultaneously adding the matching wavelength from the other loop. The adding and dropping of wavelengths often occur together. Each wavelength is commonly referred to as a channel or data channel. A tunable WDM add/drop system exists at the points to facilitate these exchanges.

In general, tunable WDM add/drop systems often utilize fixed or tunable fiber Bragg gratings (FBG) to provide the necessary wavelength selectivity for the add/drop function. To add or drop a specific wavelength, the accurate control of the signal at an absolute wavelength is of high requirement. Any deficient design in the tuning wavelength accuracy could lead to problems that may include optical cross talk, signal fluctuation and numerous other undesirable effects.

There have been many efforts in design absolute wavelength selectivity. One exemplary technology is to fabricate wavelength selective elements based on recording an index of refraction grating in the core of an optical fiber, for instance, disclosed in U.S. Pat. No. 4,474,427 to Hill et al. and U.S. Pat. No. 4,725,110 to Glenn et al. A difficulty with conventional fiber Bragg gratings is that they filter only a fixed wavelength. Each grating selectively reflects light in only a narrow bandwidth centered around a desired wavelength. However, in many applications, such as tunable multiplexing, it is desirable to have a grating whose wavelength response can be tuned, that is, controllably altered for a desired wavelength. A tunable FBG can be realized by stretching, compressing or heating the device. The tunable designs, on the other hand, have stringent requirements of accurate control over an absolute wavelength to ensure the proper functioning of the system. Therefore, there is a need for techniques of how to control effectively and precisely the wavelength selectivity of a tunable device.

SUMMARY OF THE INVENTION

The present invention pertains to methods and apparatus for calibrating tunable Fiber Bragg Gratings (FBG) using a probing signal as a reference so as to achieve an accurate control over an absolute wavelength of the tunable FBGs. According to one aspect of the present invention, the probing signal being a calibrated optical signal with a spectrum centered at a desired add/drop channel or wavelength is introduced into an N-port circulator coupled between two tunable FBGs. When the two tunable FBGs are tuned around the desired wavelength, a portion of the probing signal will be reflected or dropped out by the two tunable FBGs. The dropped probing signal is detected and coupled to a signal processor or circuitry that is configured to generate adjustments to or control signals for controlling the FBG used in the device in accordance with the reflected probing signal being maximized.

There are many benefits, advantages and features in the present invention. One of them is to achieve the stringent requirement on accurate controls over an absolute wavelength commonly used in the tunable FBG designs. Another one of the benefits, advantages and features in the present invention is to form a resonant cavity by inserting a circulator between a pair of FBGs tuned at the same desired wavelength so as to prevent possible resonant interference.

Other objects, features, and advantages of the present invention will become apparent upon examining the following detailed description of an embodiment thereof, taken in conjunction with the attached drawings.

BRIEF DESCRIPTION OF THE DRAWINGS

These and other features, aspects, and advantages of the present invention will become better understood with regard to the following description, appended claims, and accompanying drawings where:

DETAILED DESCRIPTION OF THE PREFERRED EMBODIMENT

The present invention pertains to fiber optical add/drop systems or devices. One of the applications of the devices is for multiplexing or demultiplexing WDM optical signals. According to one aspect of the present invention, techniques are employed for calibrating tunable Fiber Bragg Gratings (FBG) using a probing signal as a reference so as to achieve accurate controls over an absolute wavelength commonly used in the tunable FBG designs. In one embodiment of the present invention, a probing light signal is generated and coupled to a circulator that at the same time receives a reflected light signal from a tunable FBG. The reflected light signal is measured electronically and used to adjust the wavelength selectivity of the tunable FBG. As a result, the reflected light signal is maximized so as to precisely adjust the tunable FBG.

The detailed description of the present invention is presented largely in terms of procedures, steps, logic blocks, processing, or other symbolic representations that directly or indirectly resemble the operations of optical devices or systems coupled to optical networks. These process descriptions and representations are typically used by those skilled in the art to most effectively convey the substance of their work to others skilled in the art. Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments.

Figure 1:
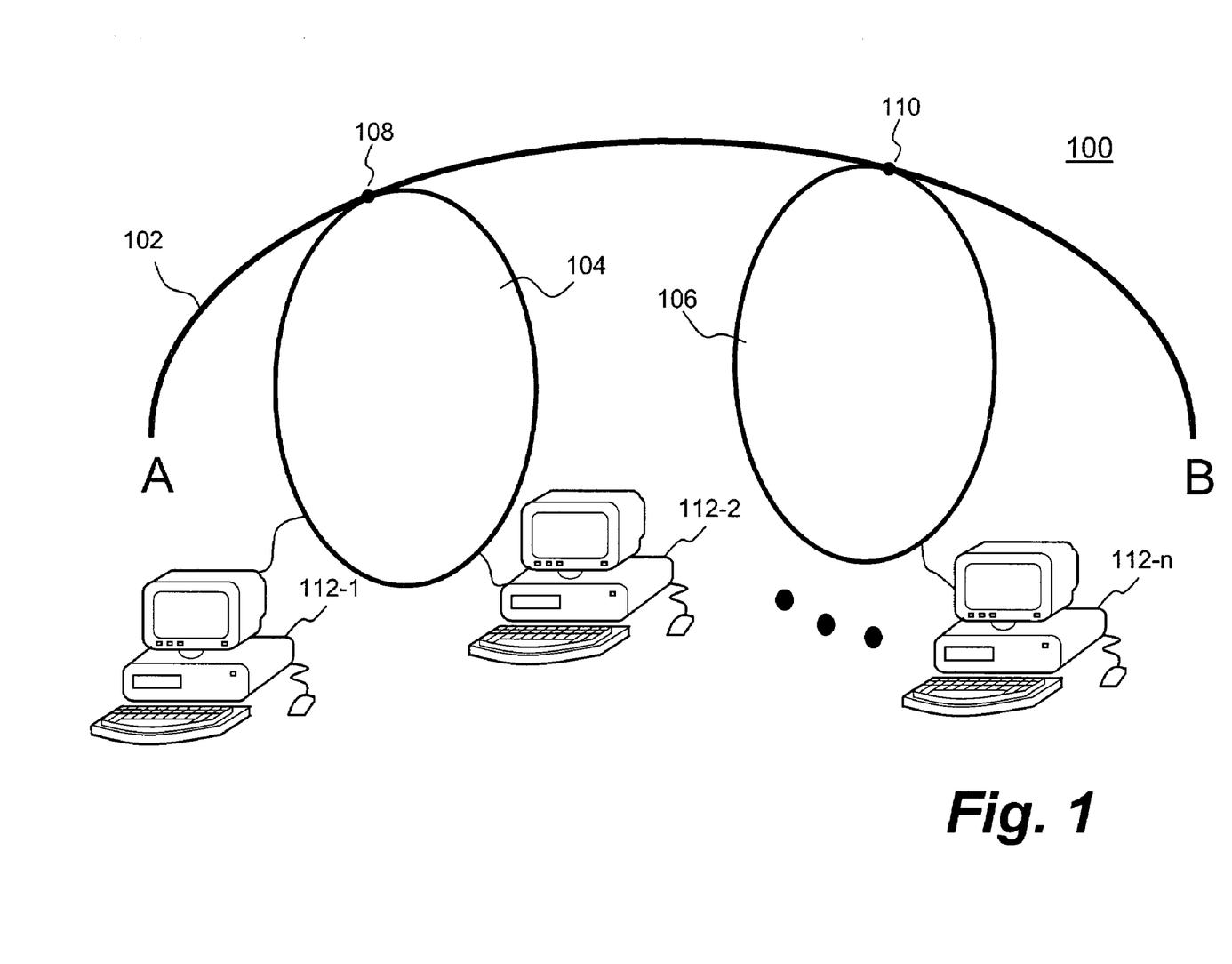
FIG. 1 shows a simplified optical network in which the present invention may be practiced.

Referring now to the drawings, in which like numerals refer to like parts throughout the several views. FIG. 1 illustrates a simplified optical network 100 in which the present invention may be practiced. The optical network 100 comprises a main loop 102 connecting two primary locations A and B. Between the two primary locations A and B, there are two local loops 104 and 106 coupled with the main loop 102 at coupling points 108 and 110. When an optical multiplexed signal including multiple channel signals (i.e. individual optical signals at various wavelengths) travels from A to B, the multiplexed signal may add and drop one or more channels from local loop 104 at the coupling point 108. The new signal will continue to travel towards the coupling point 110 where one or more channels are added to and dropped from the signal from local loop 104 at coupling point 110, and eventually to B. Within each local loop 104 and 106, optical signals including the dropped channels may be transmitted to various locations within its loop. Local receivers to convert the optical signals into electronic signals in an appropriate protocol format. Conversely, electronic signals to be transmitted from one or more of the local transmitters may be converted to optical signals (i.e. individual channels) to be added to the signal traveling in the main loop 102 at coupling point 110.

To facilitate the add/drop functions, one or more optical devices, referred to as add/drop subsystem or device, are often needed. A Fiber Bragg Grating (FBG) is often used. A fiber Bragg grating is made from a section of ordinary single-mode optical fiber, typically a few millimeters to a few centimeters in length. The grating is formed by causing periodic variations in the index of refraction of the glass lengthwise along the fiber. The period of the index modulation can be designed to cause deflection of light at a specific wavelength, namely the Bragg wavelength. Typically the light at the Bragg wavelength is selectively reflected while all other wavelengths are transmitted, essentially unperturbed by the presence of the grating.

Often the specific wavelength can not be predetermined and even if it was determined, the specific wavelength would be preferably altered to add/drop other wavelengths. Thus, a tunable FBG is commonly used. The center wavelength of a tunable FBG may vary upon the application of an external electrical potential or the application of a change in temperature. As used herein, a signal that is used to apply to a tunable FBG to affect its wavelength selectivity is referred to as a wavelength selectivity control signal, or a control signal. Those skilled in the art will understand that this control signal may be used differently depending upon an exact implementation of a tunable FBG. In one possible case, the control signal is used to calibrate an external electrical potential to control a tunable FBG. In another possible case, the control signal is applied directly to affect the wavelength selectivity in a tunable FBG. In any case, the FBG has a spectrum response of transmission that allows all wavelengths, except for one, to pass through. The one that is not passed is centered at wavelength $\lambda_X$ and be reflected or dropped out.

Figure 2:
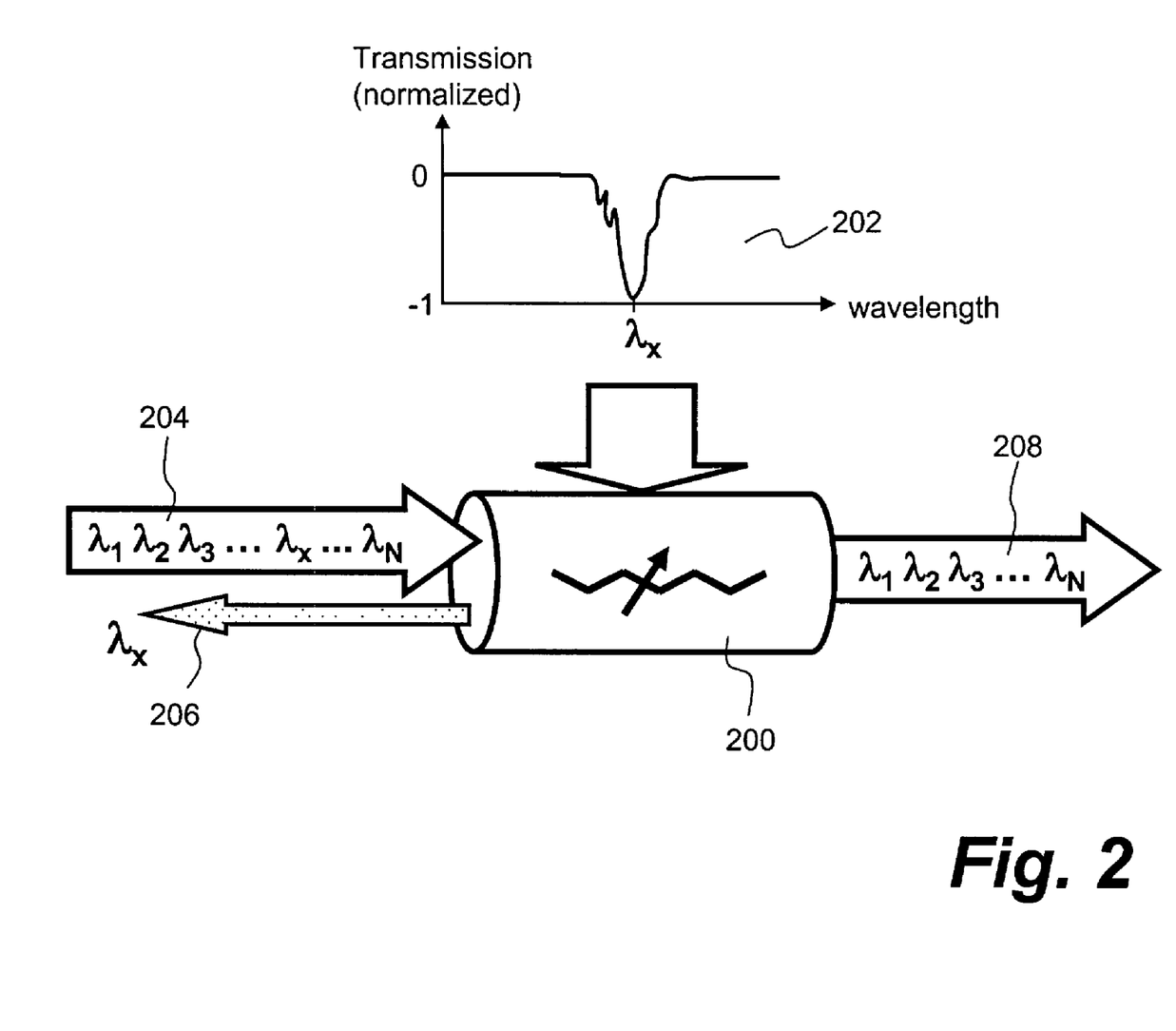
FIG. 2 illustrates graphically a tunable FBG that "tunes" specifically for a specific wavelength $\lambda_X$ in response to an externally applied control signal.

FIG. 2 illustrates graphically a tunable FBG 200 that "tunes" specifically for a specific wavelength $\lambda_X$ in response to an externally applied control signal 202 centered at $\lambda_X$. In particular, a multiplexed optical signal 204 including wavelengths $\lambda_1 \lambda_2 \lambda_3 \ldots \lambda_X \ldots \lambda_K$ coupled into the tunable FBG 200, a channel 206 (i.e. wavelength $\lambda_X$) will be reflected from the tunable FBG 200 and the rest of the channels 208 at $\lambda_1 \lambda_2 \lambda_3 \ldots \lambda_K$ (not including $\lambda_X$) will transmit through the tunable FBG 200, wherein K is a finite positive integer and X is between 1 and K. It can be appreciated that the control signal 202 shall be accurate so that the tunable FBG 200 can be tuned correctly to reflect out a desired wavelength (e.g., $\lambda_X$). Hence the requirement to have the control signal 202 with the absolute wavelength is stringent.

Different from the prior art designs, the present invention utilizes a probing signal, errors in a control signal for a tunable FBG are iteratively minimized by detecting a reflected probing signal from the tunable FBG. Essentially, a feedback loop system is formed to maximize the reflected probing signal.

Figure 3:
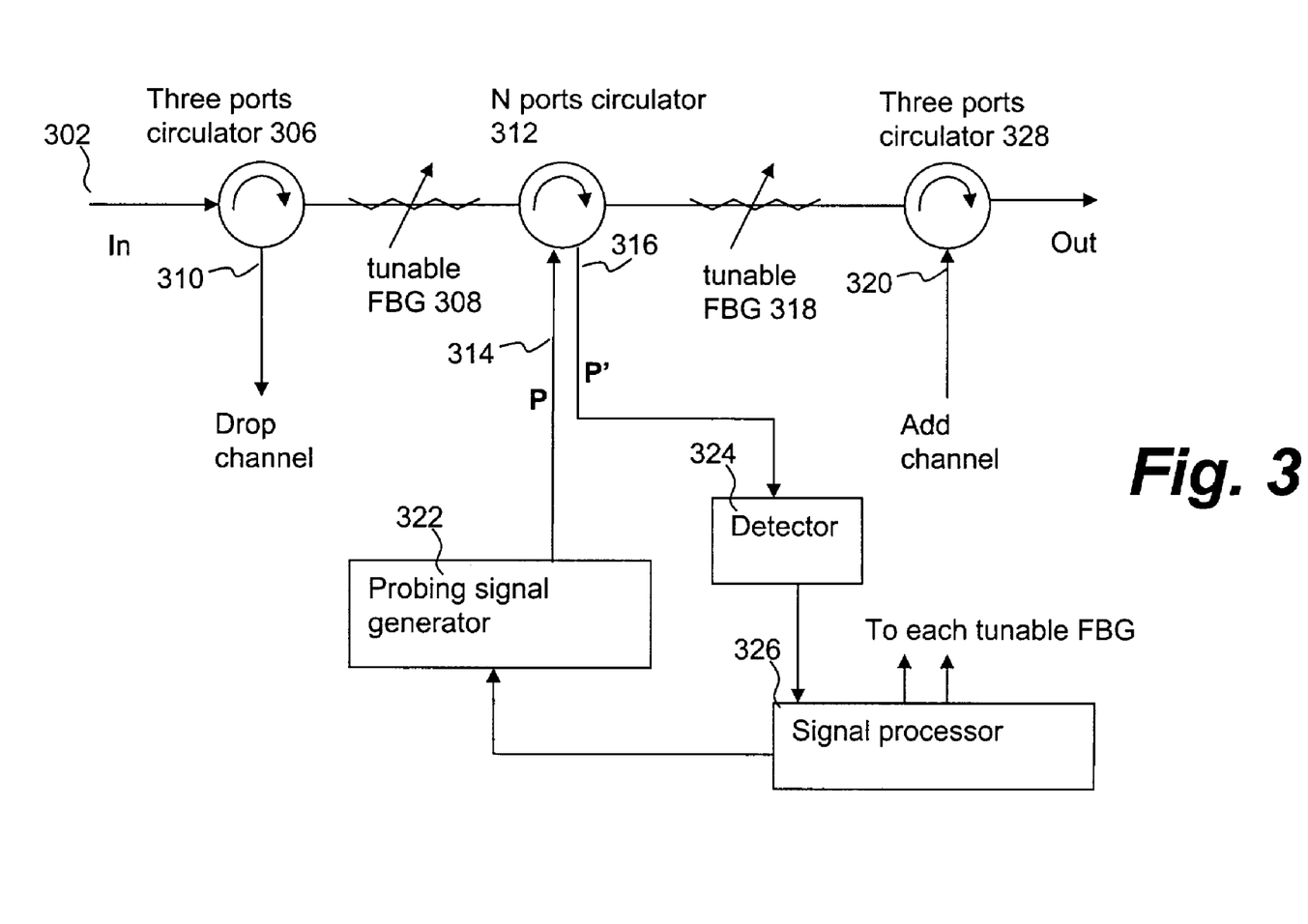
FIG. 3 shows an optical tunable add/drop device employing the present invention according to one embodiment thereof.

Referring now to FIG. 3, there is shown an optical tunable add/drop device 300 employing the present invention according to one embodiment thereof. An optical signal 302 including K channels (e.g. $\lambda_1 \lambda_2 \lambda_3 \ldots \lambda_X \ldots \lambda_K$) arrives at an input port of a three-port circulator 306. As the signal 302 travels to a first tunable FBG 308 that is being applied with a control signal or wavelength $\lambda_X$ from a signal processor 326. A wavelength $\lambda_X$ in the signal 302 is reflected by the first tunable FBG 308 and the rest of the wavelengths in the signal 302 pass through the first tunable FBG 308 and arrive at an input port of an N-port circulator 312, where N is at least 4. The reflected wavelength $\lambda_X$ is dropped out from the signal 302 through a port 310 of the three-port circulator 306.

The output of the first tunable FBG 308, namely, the rest of the wavelengths in the signal 302 passing through the first tunable FBG 308, now transmits through the N-port circulator 312 as well as the second tunable FBG 318. In passing through a three-port circulator 328, the rest of the wavelengths in the signal 302 picks up a wavelength $\lambda_X$ added from a port 320 of the three-port circulator 328, as such, the add/drop process or add/drop multiplexing/demultiplexing process has completed.

It can be observed that if either of the first tunable FBG 308 and the second tunable FBG 318 is not tuned properly, for example, at $\lambda_X \pm \Delta$, the desired channel to be dropped or added would be off the wavelength $\lambda_X$, resulting in undesired effects (e.g., signal cross-talking).

By virtue of the present invention, a probing signal $P(\lambda_X)$ from a probing signal generator 322 is introduced through a port 314 of the N-port circulator 312. As will be further explained below, the probing signal $P(\lambda_X)$ is generated and calibrated (or centered) at wavelength $\lambda_X$ in probing signal generator 322. Alternatively, the probing signal is a calibrated optical signal with a spectrum centered at a desired add/drop channel or wavelength (e.g., $\lambda_x$).

In operation, the probing signal $P(\lambda_x)$ is introduced from the port 314 of the N-port circulator 312 and propagated to both of the first and second tunable FBGs 308 and 318. If either one of the first and second tunable FBGs 308 and 318 is not properly tuned to reflect $\lambda_x$, a portion or all of the probing signal P(x) will be reflected by the tunable FBG (i.e., 308 or 318). The reflected or dropped portion of the probing signal $P'(\lambda_x)$, denoted as $P'(\lambda_x)$, is coupled out of the N-port circulator 312 to a detector 324. According to one embodiment, the detector 324 detects $P'(\lambda_x)$ that can be used to generate a controlling signal Without the loss of generality, it may be assumed that $P'(\lambda_x)$ represents the original power of the probing signal and $P'(\lambda_x)$ represents the power of the probing signal reflected by the first and/or second tunable FBG 308 and 318, In operation, a feedback controlling system is used to maximize $P'(\lambda_x)$, which reflects the fact that both of the first and second tunable FBG 308 and 318 shall be tuned precisely at $\lambda_x$ as such the probing signal $P(\lambda_x)$ is completely reflected.

As will be further appreciated, one of the features in the present invention is to generate control signals to precisely control the FBG used in the device by adjusting the control signals in accordance with the reflected probing signal being maximized. Depending on implementation, there are a number of ways to implement the detector 324. One of the exemplary ways is to provide an optical sensor that detects and converts $P'(\lambda_x)$ to an electrical signal that is further fed to the signal processor 326.

To maximize $P'(\lambda_x)$, the signal processor 326 can be configured to analyze $P'(\lambda_x)$, and provide adjustments to or generate the control signals being used for both tunable FBGs 308 and 318. Iteratively and subsequently, the $P'(\lambda_x)$ can be maximized.

Regarding the signal processor 326, there are also a number of ways to implement the signal processor 326. One possible way is to utilize a digital signal processor (DSP) that is programmed to perform the adjustments to or the control signals for both tunable FBGs 308 and 318 that can subsequently maximize the power $P'(\lambda_x)$.

One of the features in the present invention is to rely on a negative feedback closed-loop including the probing signal generator 322, the detector 324 and the probing signal generator 322 to eventually to produce the control signals most suitably for the tunable FBGs. In other words, both of the control signals for the tunable FBGs 308 and 318 can be subsequently and precisely adjusted at $\lambda_x$. As a result, the wavelength to be dropped out from the port 310 of the three-port circulator 306 or added to the port 320 of the three-port circulator 328 can be precisely adjusted at $\lambda_x$.

It should be noted that the tunable FBGs 308 and 318 used in FIG. 3 are based on one embodiment. Those skilled in that art can appreciate by now that the features, benefits and advantages may be applied to other tunable optical devices such as thin film filters and acoustical optical filters. In essence, a resonant cavity is formed by inserting a circulator between a pair of tunable optical devices, both tuned at the same desired wavelength so as to prevent possible resonant interference to other signals.

Figure 4A:
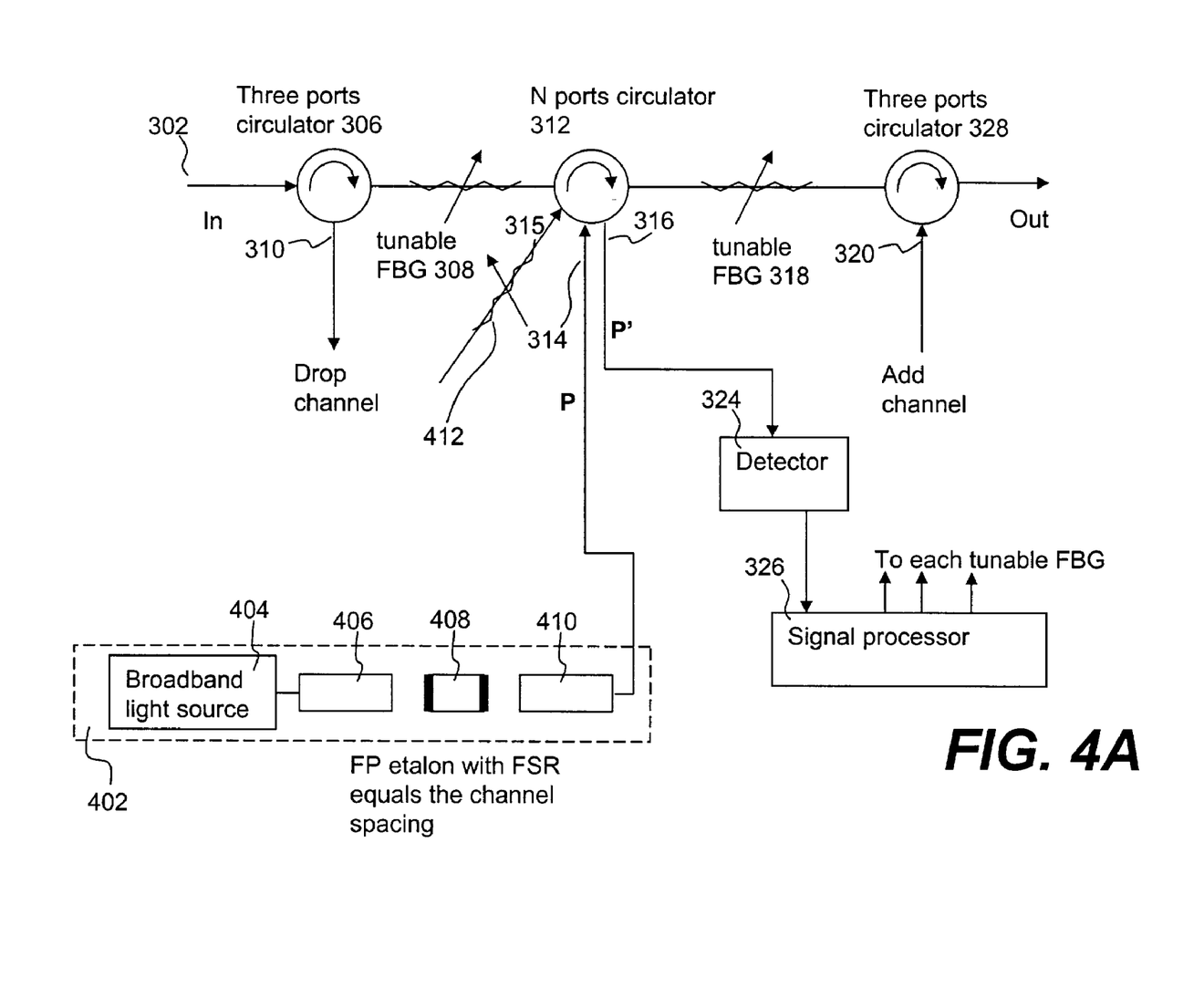
FIG. 4A shows a first exemplary implementation of generating the probing signal $P(\lambda_x)$ used in FIG. 3.
Figure 5:
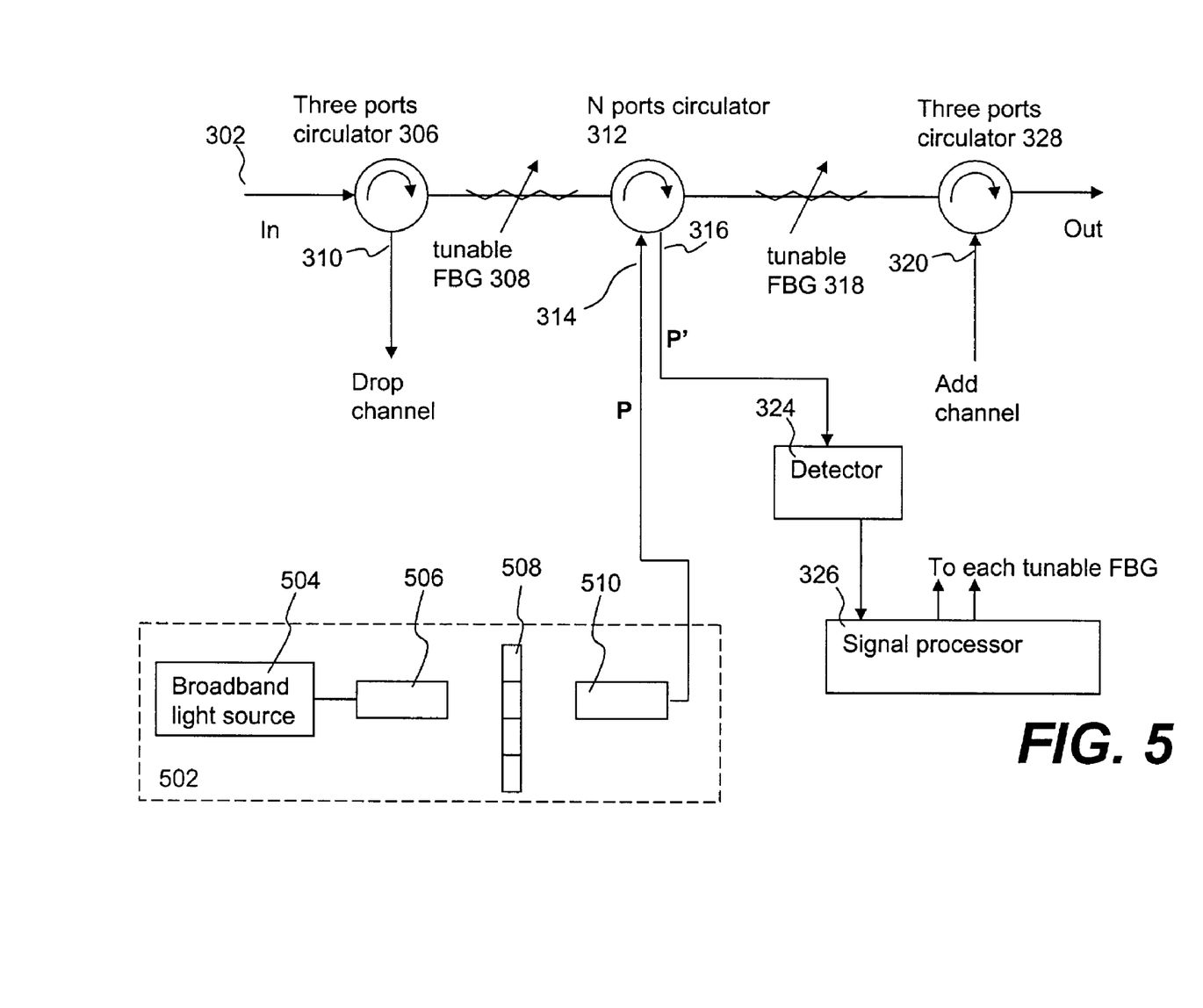
FIG. 5 and FIG. 6 show a second and a third exemplary implementation of generating the probing signal $P(\lambda_x)$ used in FIG. 3.
Figure 6:
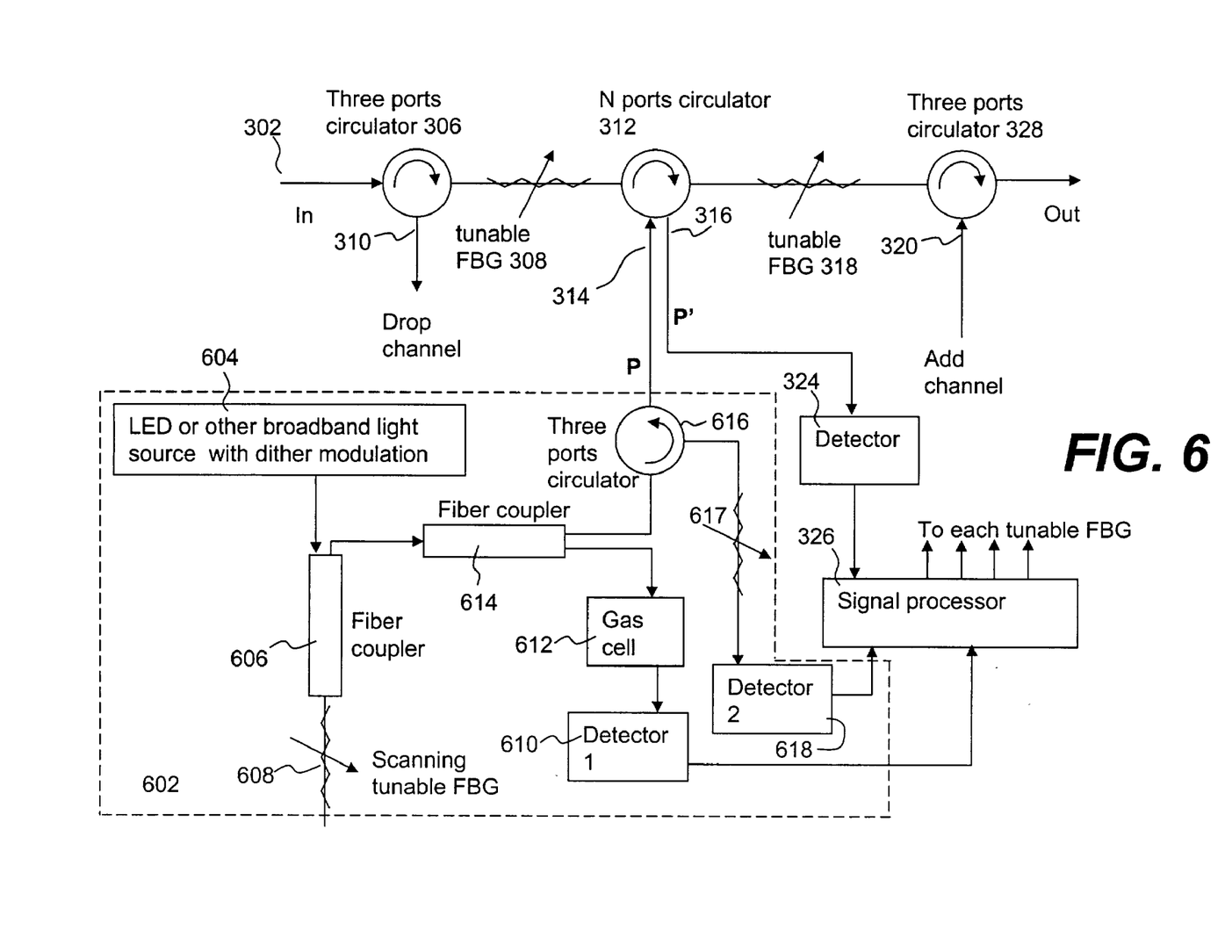

For completeness, FIG. 4A, FIG. 5 and FIG. 6 shows respectively three exemplary implementations of generating the probing signal $P(\lambda_x)$ used in FIG. 3. As described above, one of the objectives for the probing signal $P(\lambda_x)$ is that the probing signal is a calibrated narrow band optical signal with a spectrum centered at a desired add/drop channel.

Figure 4B:
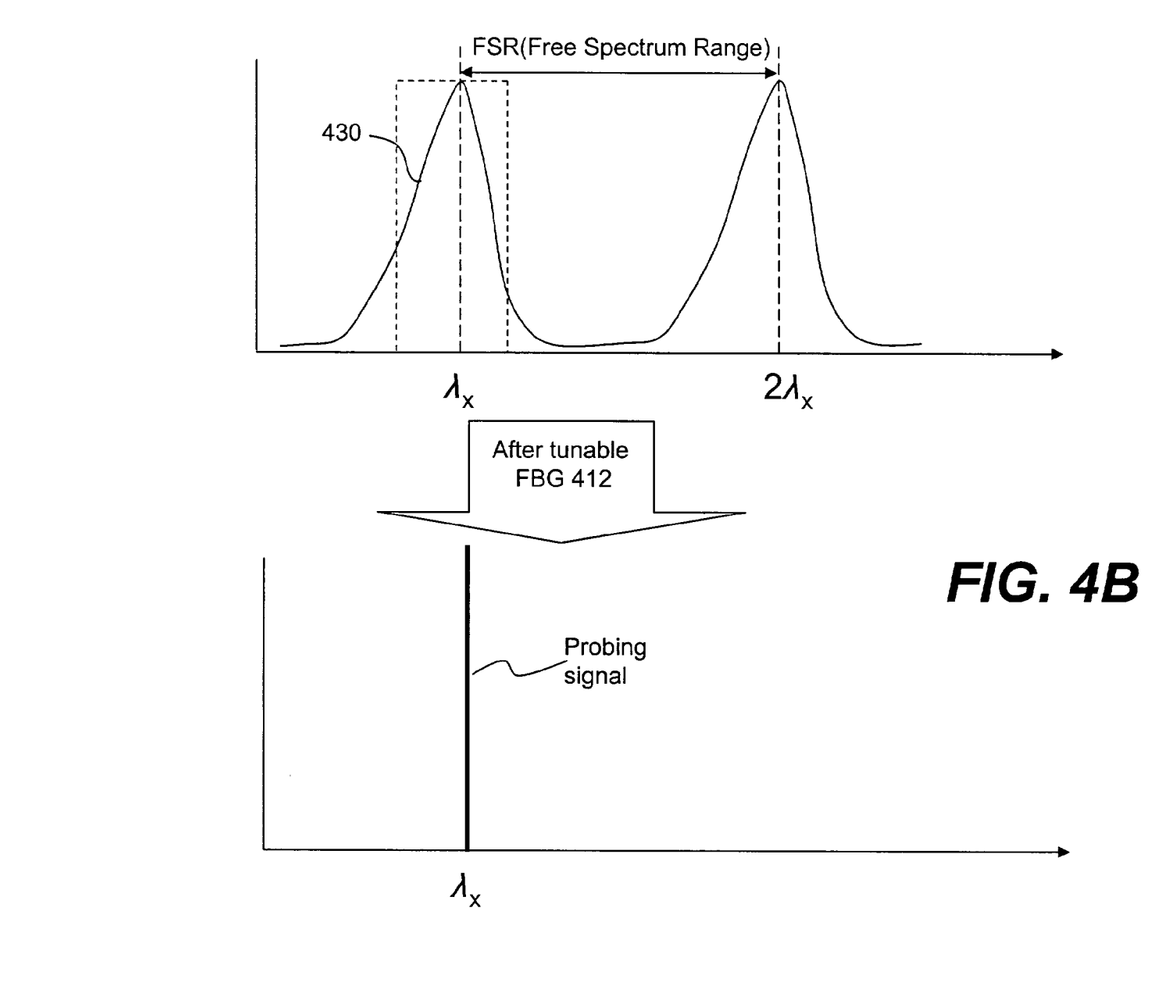
FIG. 4B graphically illustrates curves of a signal from a broadband signal source and a probing signal derived therefrom.

Referring now to FIG. 4A, there is shown a first configuration 400 of generating the probing signal $P(\lambda_x)$ used in FIG. 3. The first configuration 400 replicates most of FIG. 3 and shows a signal source 402 that comprises a broadband light source 404, two collimators 406 and 410 and an FP Etalon 408. In operation, the signal source 402 produces a narrowband signal 430 that is a multi-peak comb signal with its peaks centered at at least the add/drop wavelength $\lambda_x$ or respectively with a multiple of wavelength $\lambda_x$ as shown FIG. 4B. The signal 430 is then coupled to the port 314 of the N-port circulator 312. To refine the signal 430 to the probing signal $P(\lambda_x)$, an additional port 315 of the N-port circulator 312 (now N is at least 5) is coupled to a third tunable FBG 412 that is also controlled by the signal processor 326. As a result, the probing signal $P(\lambda_x)$ is produced and coupled back into the N-port circulator 312.

Referring to FIG. 5, there is shown a second configuration 500 of generating the probing signal $P(\lambda_x)$ used in FIG. 3. The second configuration 500 replicates most of FIG. 3 and shows a signal source 502 that includes a broadband light source 504, two collimators 506 and 510, and a multi-thin-film filter 508. To produce a desired probing signal with its peaks centered at at least the add/drop wavelength $\lambda_x$ or respectively with a multiple of wavelength $\lambda_x$ as shown FIG. 4B, the multi-thin-film filter 508 between the two collimators 506 and 510 is slid to the desired filter with its center wavelength at $\lambda_x$. In other words, the multi-thin-filter 508 including a plurality of thin films moves according to the sontrolling system to generate the probing signal $P(\lambda_x)$ that is centered at $\lambda_x$.

Figure 7A:
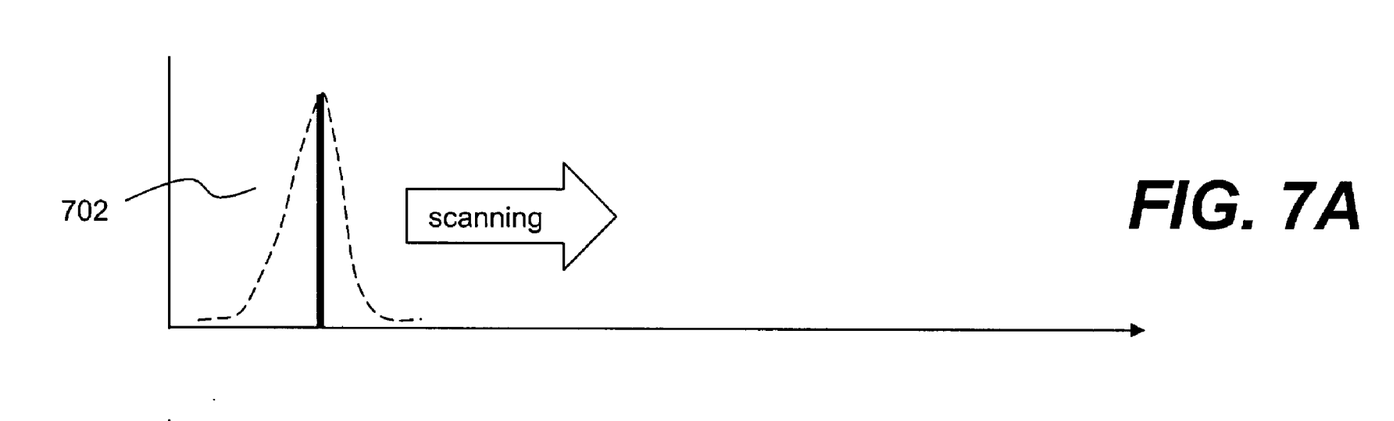
FIG. 7A and FIG. 7B show collectively a probing signal being derived from a broadband signal source.
Figure 7B:
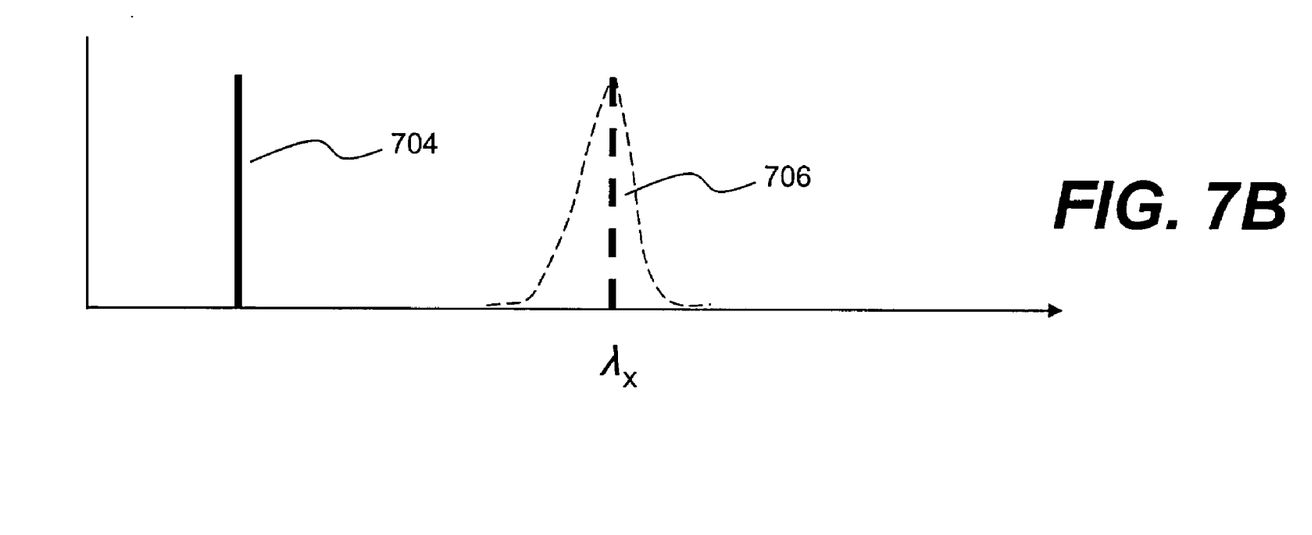

Referring to FIG. 6, there is shown a third configuration 600 of generating the probing signal $P(\lambda_x)$ used in FIG. 3. The third configuration 600 replicates most of FIG. 3 and shows a signal source 602 that includes a broadband light source 604, two fiber couplers 606 and 614, a scanning tunable FBG 608, a gas cell 612, two detectors 610 and 618, a tunable FBG 617, and a 3-port circulator 616. In operation, the broadband light source 604, together with a scanning tunable FBG 608, produces a narrowband scanning signal 702 as shown FIG. 7A. In other words, the scanning signal 702 is repeatedly moving over time. The signal 702 is then coupled by the coupler 614 to the gas cell 612, a refference for the probing signal is generated. After the filtering performed in the gas cell 612, a probing signal 706 centered at $\lambda_x$ is produced by the circulator 616 and the tunable FBG 617 and the captured probing signal 706 shown in FIG. 7B. As shown in FIG. 6, the probing signal 706 is fed into the N-port circulator 312 through a 3-port circulator 616 together with the tunable FBG 620 also controlled by a control signal from the signal process 326. As a result, a probing signal precisely adjusted for wavelength $\lambda_x$ is produced.

The present invention has been described in sufficient details with a certain degree of particularity. It is understood to those skilled in the art that the present disclosure of embodiments has been made by way of examples only and that numerous changes in the arrangement and combination of parts may be resorted without departing from the spirit and scope of the invention as claimed. Accordingly, the scope of the present invention is defined by the appended claims rather than the foregoing description of embodiments.

We claim:

1. An optical device for add/drop functioning, comprising:
   a first tunable optical device controlled by a first control signal;

a second tunable optical device controlled by a second control signal; and an N-port circulator, coupled between the first and the second tunable optical devices, receiving a probing signal calibrated at wavelength $\lambda_x$, wherein the probing signal is transmited to the first and second tunable optical devices, the N-port circulator outputs a reflected probing signal from the first and second tunable optical devices, and the reflected probing signal is subsequently used to determine the first and second control signals such that the reflected probing signal is maximized.

2. The optical device of claim 1, wherein each of the first and second tunable optical devices is a Fiber Bragg Grating (FBG).

3. The optical device of claim 1, wherein the reflected probing signal is a portion of the probing signal reflected out by either one of or both of the first and the second tunable optical devices when not controlled precisely to reflect out the desired wavelength.

4. The optical device of claim 3, wherein the probing signal is a calibrated narrow band optical signal with a spectrum coincide with the desired wavelength.

5. The optical device of claim 4, wherein the probing signal is generated from a probing signal source.

6. The optical device of claim 5, wherein the probing signal source includes a broadband light source, two optical collimators and an FP Etalon, the FP Etalon is coupled between the two optical collimators and has a free spectrum range equal to a channel spacing, and wherein the broadband light source generates a multi-peak comb signal with its peaks centered at the desired wavelength or respectively at a multiple of the desired wavelength, the multi-peak comb signal is refined by the FP Etalon to a multi-impulse signal.

7. The optical device of claim 6, wherein the multi-impulse signal is coupled to a third tunable FBG that is turned at the desired wavelength and outputs the probing signal.

8. The optical device of claim 5, wherein the probing signal source includes a broadband light source, two optical collimators and a thin-film filter, the broadband light source generates a multi-peak comb signal with its peaks centered at the desired wavelength or respectively at a multiple of the desired wavelength, the thin-film filter includes a plurality of thin films and is caused to move back and forth to refine the multi-peak comb signal to form the probing signal.

9. The optical device of claim 5, wherein the probing signal source includes a broadband light source with dither modulation that generates a scanning signal with its peak falling on the desired wavelength or respectively on a multiple of the desired wavelength.

10. The optical device of claim 9, wherein a filtering of the scanning signal is performed in a gas cell to generate a reference signal in accordance with the probing signal that is subsequently produced by a circulator and a tunable FBG.

11. The optical device of claim 1, wherein the reflected probing signal is detected and coupled to a signal processor for computing adjustments to the first and second control signals such that the reflected probing signal is maximized.

12. The optical device of claim 1, wherein the reflected probing signal is detected and coupled to a signal processor for generating updated versions of the first and second control signals such that the reflected probing signal is maximized.

13. The optical device of claim 1, wherein the first and second tunable optical devices and the N-port circulator forms a resonant cavity to prevent possible resonant interference.

14. A method for providing add/drop functioning, the method comprising:

forming a resonant cavity for a desired wavelength by inserting an N-port circulator between a first and a second tunable optical device;

introducing a probing signal into the first and second tunable optical devices through a port of the N—port circulator; and maximizing a reflected signal of the probing signal reflected from the first and second tunable optical devices by iteratively adjusting two control signals, respectively, to control the first and second tunable optical devices.

15. The method of claim 14, wherein each of the first and second tunable optical devices is a Fiber Bragg Grating (FBG).

16. The method of claim 14, wherein the reflected signal is a portion of the probing signal as a result of either one of or both of the first and the second tunable optical devices not controlled precisely to reflect out the desired wavelength.

17. The method of claim 16, wherein the reflected signal is provided to a signal processor or circuitry configured to produce adjustments to the two control signals.

18. The method of claim 16, wherein the reflected signal is provided to a signal processor or circuitry configured to generate the two control signals.

19. The method of claim 14, wherein the probing signal is a calibrated narrow band optical signal with a spectrum coinciding with the desired wavelength or a multiple of the desired wavelength.

20. The method of claim 14, wherein the probing signal is generated from an external probing signal source.

* * * * *